US006900778B1

(12) United States Patent
Yamamoto

(10) Patent No.: US 6,900,778 B1
(45) Date of Patent: May 31, 2005

(54) DISPLAY APPARATUS AND METHOD WITH DETECTING ELEMENTS ALLOCATED ON SIDE FACING FACE OF USER AND ON LOWER SIDE OF DISPLAY WINDOWS

(75) Inventor: Hiroshi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,728

(22) Filed: Feb. 10, 2000

(30) Foreign Application Priority Data

Feb. 12, 1999 (JP) ............................................ 11-034955
Feb. 9, 2000 (JP) ....................................... 2000-032393

(51) Int. Cl.[7] ................................................ G09G 5/00
(52) U.S. Cl. .......................................................... 345/8
(58) Field of Search .......................... 345/7, 8, 9, 617, 345/589, 601, 602, 102; 348/602, 603, 227; 359/630, 631, 632, 13

(56) References Cited

U.S. PATENT DOCUMENTS 5,554,912 A * 9/1996 Thayer et al. ............... 315/157
5,640,171 A * 6/1997 Shimada .......................... 345/8
6,052,166 A * 4/2000 Chikazawa .................. 349/116
6,329,964 B1 * 12/2001 Tanaka ........................... 345/8

FOREIGN PATENT DOCUMENTS

FR 2517916 * 6/1983

* cited by examiner

Primary Examiner—Chanh Nguyen
(74) Attorney, Agent, or Firm—Cowan, Liebowitz & Latman

(57) ABSTRACT

A display apparatus and method in which a display unit displays a first image for a left eye and a second image for a right eye. First and second detecting elements detect a brightness around the left eye and right eye, respectively, and first and second brightness adjusting units adjust a brightness of first and second images according to the brightness detected by the first and second detecting elements, respectively. The first detecting element is allocated on a side facing to a face of a user and is allocated on a lower side of a first display window which displays the first image. The second detecting element, in turn, is allocated on a side facing to a face of the user and is allocated on a lower side of a second display window which displays the second image.

14 Claims, 13 Drawing Sheets

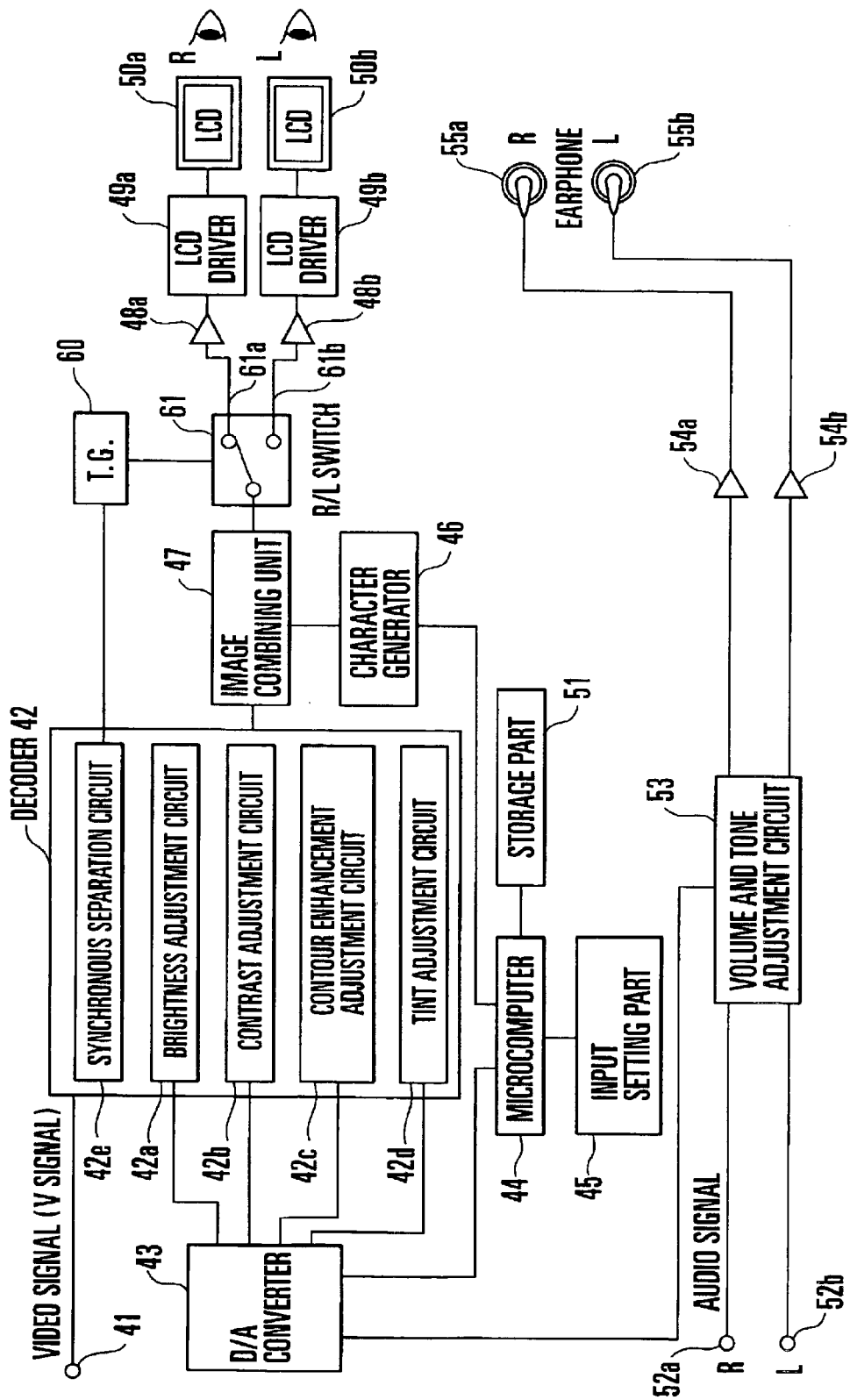

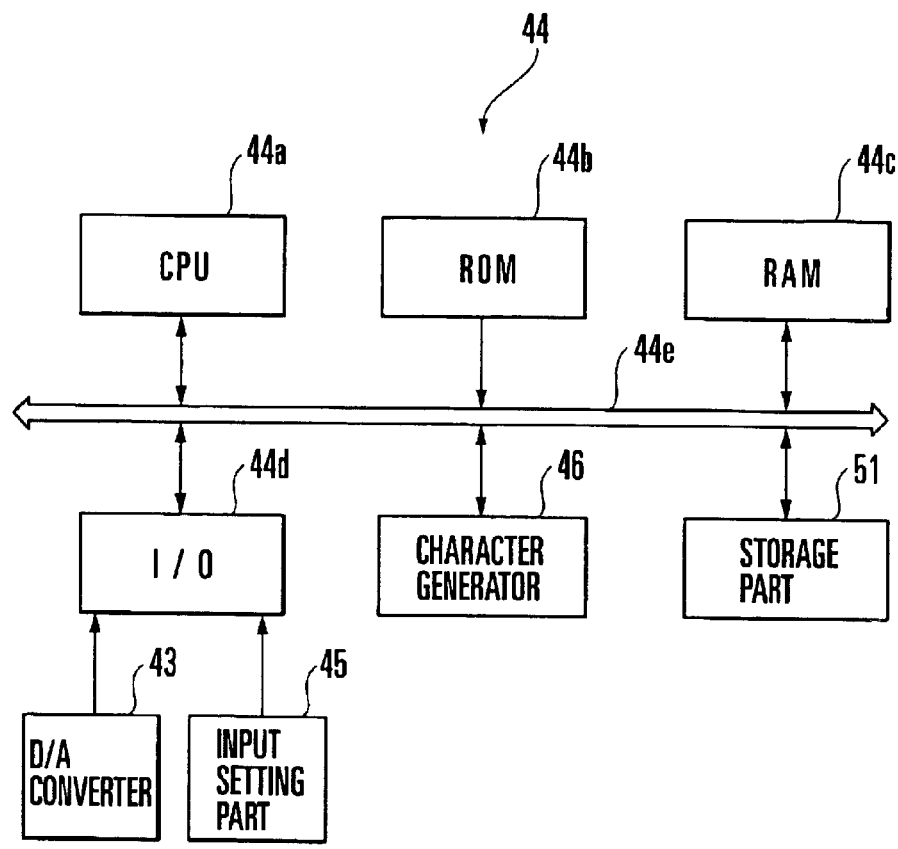

F I G. 15

| | BRIGHTNESS | CONTRAST | CONTOUR ENHANCEMENT | TINT |
|---|---|---|---|---|
| STANDARD MODE | STANDARD | STANDARD | STANDARD | STANDARD |
| ANIMATION MODE | BRIGHT | SLIGHTLY STRONG | — | — |
| MOVIE MODE | DARK | SLIGHTLY STRONG | WEAK | — |
| OUTDOOR MODE | MAXIMUM | STRONG | SLIGHTLY STRONG | — |
| MANUAL MODE | — | — | — | — |
| AUTOMATIC | — | — | — | — |

DISPLAY APPARATUS AND METHOD WITH DETECTING ELEMENTS ALLOCATED ON SIDE FACING FACE OF USER AND ON LOWER SIDE OF DISPLAY WINDOWS

BACKGROUND OF THE INVENTION

1. Field of the Invention

The present invention relates to a display apparatus arranged to adjust the display state of an image displayed on an image plane in a display mode in which the setting values of brightness, contrast, contour enhancement, etc., for the image plane are combined.

2. Description of Related Art

Display apparatuses called head-mounted display apparatuses arranged to be used by mounting them on the heads of users (hereinafter referred to as HMDs) have been known. Many of the known HMDs are arranged to permit manual adjustment of the brightness of their image planes. The brightness of the image planes has been thus arranged to be set and adjusted to a desired brightness irrespective of the brightness of external environment of them.

However, the conventional HMDs have presented a problem which has required some improvement. When an HMD is used in a place such as a bright outdoor environment, particularly in a place receiving sunlight or under a bright illumination light, the external light enters the HMD through a gap between the HMD and the face of the user, as shown in FIG. 1. If the quantity of light from outside is larger than the light of a display image plane of the HMD, the image plane becomes difficult to see even with the image plane set brighter. In the case of liquid crystal display (LCD) image planes which are used in many HMDs, in particular, the increase of only the brightness of the image plane nullifies image contrast to whiten the whole image plane. Then, the HMDs become almost useless in such a state.

To solve this problem, some of HMDs have been developed to prevent external light from entering the eyes of the user, by providing some shield between the HMD and the face of the user. However, the use of the shield makes the HMD heavier and becomes a nuisance to the user as it covers all parts around the eyes. The use of such an HMD sometimes causes the user to feel oppressively warm or uneasy as it prevents the user from knowing the conditions of surroundings.

BRIEF SUMMERY OF THE INVENTION

To solve the above-stated problem of the prior art, it is an object of the invention to provide a head-mounted display apparatus (HMD), or a display method or a storage medium, arranged to have a display mode which is suited for use under a bright external environment and makes an image displayed on an image plane easily viewable even under a bright surrounding condition without having any shield between the HMD and the face of the user.

It is another object of the invention to provide a display apparatus, a display method or a storage medium, arranged such that, with a display mode once changed and selected, the selected display mode can be retained after a power supply is switched off, without resetting the display mode.

It is a further object of the invention to provide a display apparatus, a method or a storage medium, arranged to be capable of automatically changing a display image plane to a more easily viewable state according to the brightness of an external environment.

It is a further object of the invention to provide a display apparatus arranged to permit varying the brightness, contrast and contour enhancement of the image plane of display means according to the brightness of the ambient light of the display apparatus.

It is a still further object of the invention to provide a display apparatus arranged to permit varying the brightness, contrast and contour enhancement of the image plane of each of left and right display means according to the brightness of the ambient light of the right and left display means independently of each other.

In accordance with the invention, the above and other objectives are attained in a display apparatus comprising: a display unit adapted to display a first image for a left eye and a second image for a right eye; a first detecting element adapted to detect a brightness around the left eye; a second detecting element adapted to detect a brightness around the right eye; a first brightness adjusting unit adapted to adjust a brightness of the first image according to the brightness detected by the first detecting element; and a second brightness adjusting unit adapted to adjust a brightness of the second image according to the brightness detected by the second detecting element, wherein the first detecting element is allocated on a side facing to a face of user and is allocated on a lower side of a first display window which displays the first image, and wherein the second detecting element is allocated on a side facing to a face of user and is allocated on a lower side of a second display window which displays the second image.

These and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 2 is a block diagram showing the electrical arrangement of an HMD according to a first embodiment of the invention.

FIG. 3 is a block diagram showing the arrangement of a microcomputer 44 shown in FIG. 2.

FIG. 4 shows in a table the setting values of various display modes stored in a storage part 51 shown in FIG. 2.

FIG. 15 shows in a table the setting values of various display modes stored in a storage part 51 which is included in the third embodiment of the invention.

DETAILED DESCRIPTION OF THE INVENTION

Hereinafter, preferred embodiments of the invention will be described in detail with reference to the drawings.

In the case of display apparatuses arranged according to the invention as described below, the invention is applied to head-mounted display apparatuses (HMDs).

Figure 1:
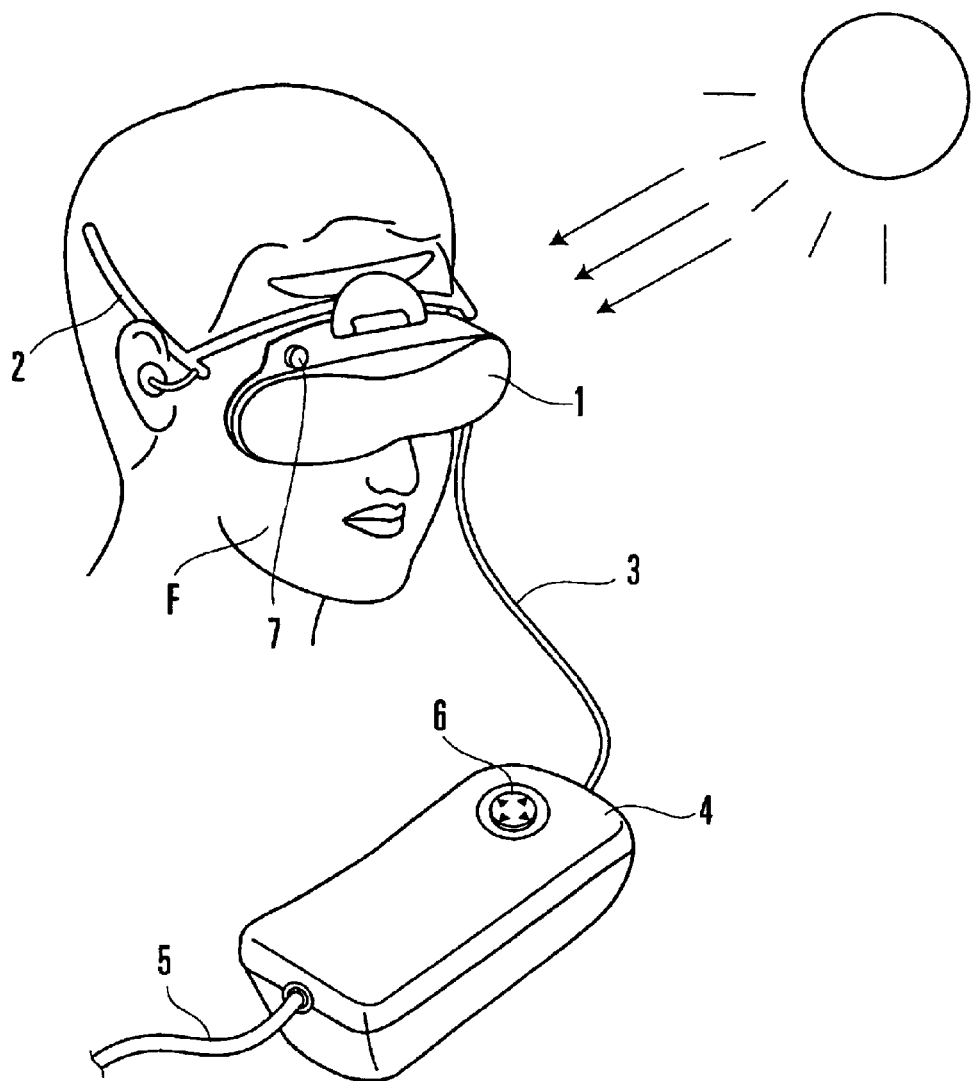
FIG. 1 is a perspective view showing an HMD, which is a display apparatus according to the invention, in a state of being mounted on the head of a user.

FIG. 1 shows an HMD arranged according to the invention in a state of being mounted on the head of a user. The HMD is used by securing a head mounting member 2 to the head. A display device 1 is mounted on the head mounting member 2. A control box 4 is connected to the display device 1 through a cable 3. An image signal transferred from a cable 5 connected to the control box 4 is sent to the display device 1. A mode selection switch 6 is mounted on a front surface of the control box 4. The mode selection switch 6 has a setting and defining function. The display device 1 is thus secured to the head of the user by means of the head mounting member 2.

In general, with the HMD mounted on the head of the user, some gap is left between the face F of the user and the display device 1. Some external light then enters the eyes of the user through the gap. If an image on an image plane is darker than the external light, the image becomes not easily viewable.

In the case of the HMD, ordinary video signals, such as signals of the NTSC or PAL system are inputted to the control box 4 through the cable 5. The control box 4 is arranged to control the HMD and has various functions, such as a function of selecting a display mode or a sound tone mode, a function of adjusting a sound volume, a function of measuring the length of time elapsing in the use of the HMD by means of a video signal, a function of storing information on a set mode, and a function of showing information about how to use the HMD. The control box 4 operates with a battery disposed in a housing thereof serving as a power supply. The display modes of the HMD include, as will be described further later herein, a standard mode which is used in general, a movie mode in which the image plane is set a little darker, an outdoor mode which is applicable to use in a bright place, etc. The sound tone modes of the HMD include a low tone emphasizing mode, a high tone emphasizing mode, a maximum sound volume limiting mode, etc. Selection of these functions is made by the mode selection switch 6.

A video signal processed by each applicable function is sent to the display device 1 through the cable 3. Then, a video image is displayed on a liquid crystal display (LCD) image plane of the display device 1 according to the video signal received. An audio signal processed by each applicable function is sent through the cable 3 to an earphone speaker to be emitted as sounds.

FIG. 2 is a block diagram showing the electrical arrangement of an HMD according to a first embodiment of the invention. The HMD is mainly composed of an input setting part 45, a microcomputer 44, a decoder 42, a D/A converter 43 and a storage part 51. A video signal which is supplied to a terminal 41 through the cable 5 comes to the decoder 42. The decoder 42 includes a brightness adjustment circuit 42a, a contrast adjustment circuit 42b, a contour enhancement adjustment circuit 42c, and a tint adjustment circuit 42d. The decoder 42 is provided further with a synchronous separation circuit 42e, which is arranged to separate a synchronizing signal which is included in the video signal from the video signal for the purpose of dividing the video signal into right and left images and synchronizing them when the video signal inputted is a three-dimensional video signal.

The microcomputer 44 is arranged to operate according to information received, for example, from the input setting part 45 such as the mode selection switch 6. The D/A converter 43 is arranged to select one of the various circuits included in the decoder 42 in accordance with an instruction of the microcomputer 44.

FIG. 3 is a block diagram showing the processing functional elements of the microcomputer 44. As shown in FIG. 3, the microcomputer 44 includes a CPU 44a, a ROM 44b, a RAM 44c, an I/O interface 44d, etc., which are interconnected by a bus 44e in a known manner. A character generator 46 and the storage part 51 are also connected to the bus 44e.

The microcomputer 44 actuates the character generator 46 which is arranged to generate a prescribed character code signal or image signal. The prescribed character code signal or image signal outputted from the character generator 46 is combined by an image combining unit 47 with the video signal which is adjusted by the decoder 42. A combined video signal thus formed by the image combining unit 47 is selectively outputted by an R/L change-over switch 61 which is arranged to change right and left video signals from one over to the other. The video signals selectively outputted by the R/L change-over switch 61 are amplified respectively by amplifiers 48a and 48b. The amplified video signals are transmitted to LCD drivers 49a and 49b.

The LCD drivers 49a and 49b then form video signals suited for LCDs 50a and 50b. The video signals thus processed are converted into video images to be displayed on the image planes of the LCDs 50a and 50b. The video images thus displayed are viewed by the right and left eyes of the user.

The storage part 51, which is connected to the microcomputer 44, is arranged to store various setting values set by the decoder 42 in accordance with the instruction of the microcomputer 44. The setting values stored by the storage part 51 are always updated. At the storage part 51, a plurality of display modes are stored. In each of these display modes thus stored, setting values suited for image software such as setting values of image plane brightness, contrast, contour enhancement, tint, etc., are included in combination.

FIG. 4 shows in a table the setting values of various display modes stored at the storage part 51. As shown in FIG. 4, for a standard mode, the brightness, the contrast, the contour enhancement and the tint are set respectively at standard values. For an animation mode, the brightness is set to be bright and the contrast to be slightly strong. For a movie mode, the brightness is set to be dark, the contrast to be slightly strong and the contour enhancement to be weak. For an outdoor mode, the brightness is set to be at a maximum value, the contrast to be strong, and the contour enhancement to be slightly strong. In the table of FIG. 4, a mark "-" indicates that the setting value remains unchanged by the change-over of the display mode.

Information on these display modes is stored in the storage part 51 beforehand. When one of these display modes is selected by the mode selection switch 6, the setting values of the display mode selected are read out from the storage part 51 by the microcomputer 44. The microcomputer 44 then causes, through the D/A converter 43, the various adjustment circuits of the decoder 42 to adjust the display state of an image to be displayed on the image plane accordingly. Further, the storage part 51 can be arranged to store various setting values for a manual mode to allow the user to manually set or adjust the setting values as desired. A nonvolatile memory or the like that is capable of retaining the contents of memory after the power supply is turned off is employed as the storage part 51.

Further, the D/A converter 43 has a control function over the volume and tone of sound. With a volume and a tone of sound set by the input setting part 45, the D/A converter 43 controls a volume and tone adjustment circuit 53 in accordance with the instruction of the microcomputer 44. The volume and tone adjustment circuit 53 is arranged to adjust audio signals (a right audio signal 52a and a left audio signal 52b in the case of a stereophonic arrangement) inputted through the cable 5 separately from each other. The separately-adjusted audio signals are amplified respectively by amplifiers 54a and 54b to be sent to a right ear earphone 55a and a left ear earphone 55b. Meanwhile, the setting values of sound volume and tone set by the input setting part 45 are stored in the storage part 51.

The first embodiment operates as described above when a two-dimensional video signal is inputted. In a case where a three-dimensional video signal is inputted, video images are alternately allocated for every synchronous video image by the synchronous separation circuit 42e and according to the video synchronizing signal. The timing of allocating the video images is determined by a timing signal obtained from a timing signal generator (T.G.) 60. More specifically, the R/L change-over switch 61 allocates the video signal to a right-eye video signal 61a and a left-eye video signal 61b in accordance with the timing signal from the timing signal generator 60. The video signals 61a and 61b thus allocated are displayed on a right-eye LCD 50a and a left-eye LCD 50b through LCD drivers 49a and 49b.

Figure 5:
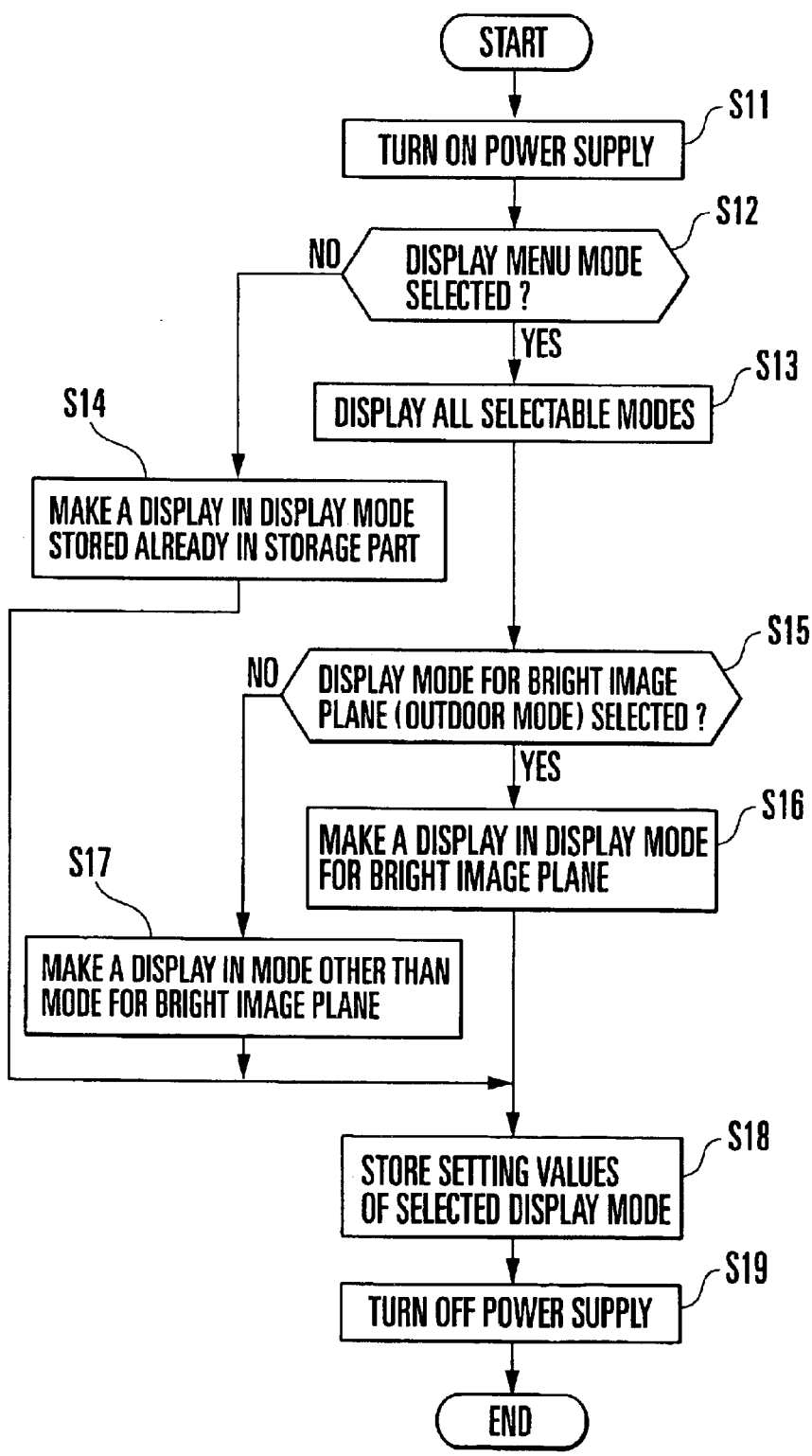
FIG. 5 is a flow chart showing procedures for selection of a display mode to be executed in the first embodiment of the invention.

FIG. 5 is a flow chart showing the display mode selecting procedures of the HMD according to the first embodiment of the invention. A program for these procedures is stored in the ROM 44b included in the microcomputer 44 and is executed by the CPU 44a also included in the microcomputer 44.

When the power supply of the HMD is turned on by the user at a step S1, the flow of operation proceeds to a step 512. At the step S12, a check is made to find if a display menu mode is selected by an operation on the mode selection switch 6. If so, the flow proceeds from the step S12 to a step S13. If not, the flow proceeds to a step 514. At the step S13, a mode selection menu is displayed on an image plane. On the other hand, at the step S14, with the display menu mode found to be not selected at the step S12, a display is made in a display mode stored in the storage part 51.

At a step S15, a check is made to find if the outdoor mode in which the image plane is bright and has a strong contrast and strong contour enhancement is selected. If so, the flow proceeds from the step S15 to a step S16. At the step S16, the image plane is set to be brighter and to have a stronger contrast and higher contour enhancement.

If the outdoor mode is found at the step 515 to be not selected, the flow proceeds from the step S15 to a step S17. At the step S17, a display is made by selecting the standard display mode or the movie display mode which is for a dark image plane. At a step S18, the setting values of the display mode selected are stored. The flow of operation comes to an end when the power supply is turned off by the user at a step S19. After the power supply is turned off, the setting values of the display mode which has remained effective up to that time are retained as they are in the storage part 51.

The above-stated procedures are arranged such that the display state of an image displayed on the image plane is adjusted in the outdoor display mode in a case where the HMD is used under a bright environment. This arrangement effectively enables the user to easily view images on display even under a bright ambient light without having any shield between the face of the user and the HMD.

Next, an HMD according to a second embodiment of the invention will be described.

The structural arrangement of the second embodiment is similar to that of the first embodiment of the invention described above.

Figure 6:
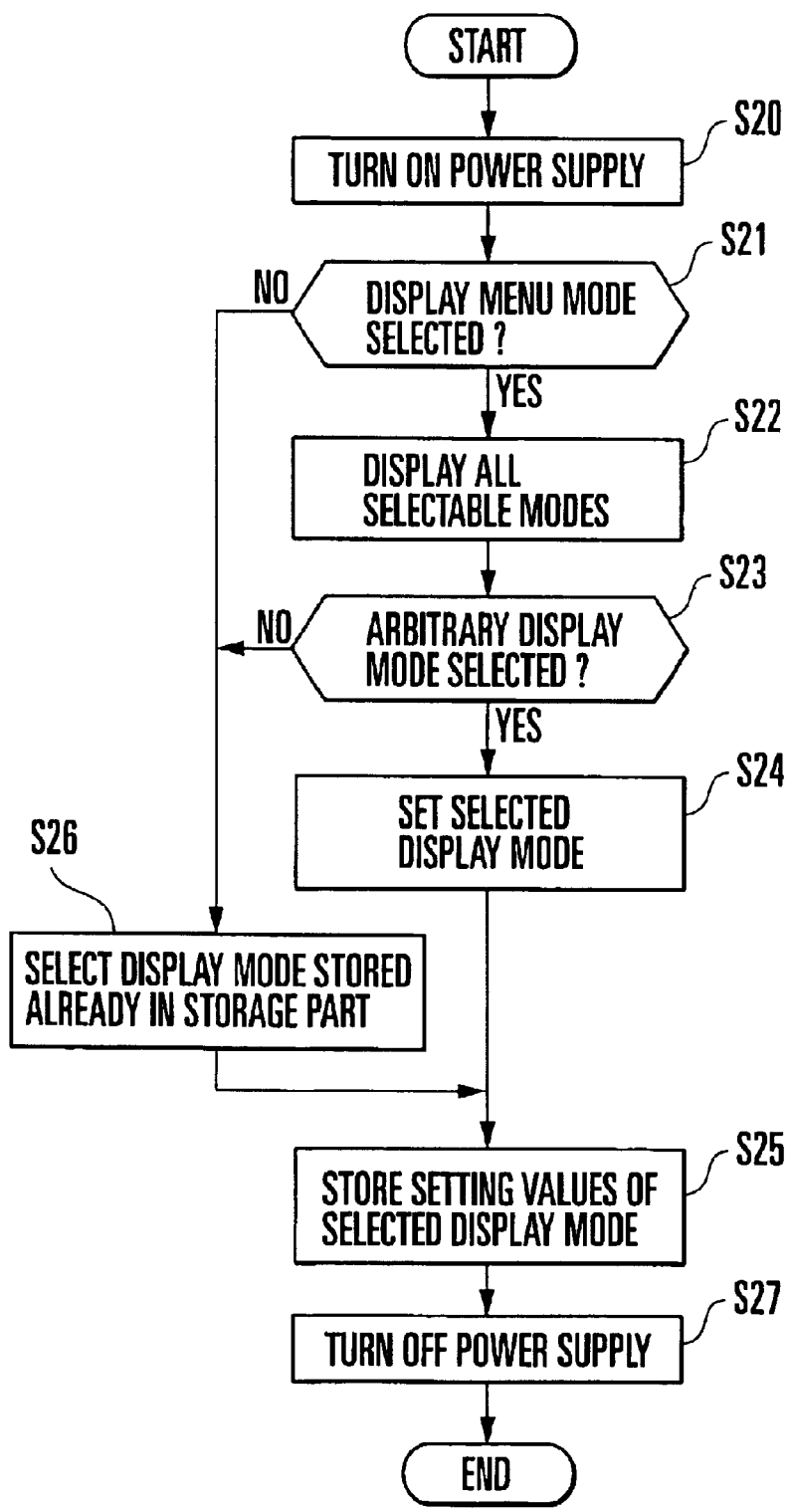
FIG. 6 is a flow chart showing procedures for selection of a display mode to be executed in a second embodiment of the invention.

FIG. 6 is a flow char showing the display mode selecting procedures of the HMD according to the second in embodiment of the invention. When the power supply of the HMD is turned on by the user at a step S20, the flow of operation proceeds to a step S21. At the step S21, a check is made in the same manner as at the step S12 described above, to find if a display menu mode is selected. If so, the flow proceeds from the step S21 to a step S22. At the step S22, a mode selection menu is displayed on an image plane. At a step S23, a check is made to find if an arbitrary display mode is selected. If so, the flow proceeds from the step S23 to a step S24. At the step S24, the HMD is set in the selected display mode. At a step S25, the setting values of the selected display mode are stored.

If the display menu mode is found at the step S21 to be not selected, or if no arbitrary display mode is found to be selected at the step S23, the flow proceeds to a step S26. At the step S26, a display mode which has already been stored is selected. The flow then proceeds from the step S26 to the step S25 to continuously store the setting values of the display mode. After that, when the power supply is turned off by the user at a step S27, the flow of operation comes to an end by keeping the setting values of the latest display mode in store.

Next, an HMD according to a third embodiment of the invention will be described.

While the first and second embodiments described above are arranged to permit the user to select a display mode by manually operating the mode selection switch 6, the third embodiment is arranged to automatically select a display mode, such as the outdoor mode, by automatically finding the state of an operating environment through the output of a light quantity detecting element. More specifically, a light quantity detecting element 7 which is arranged to detect an external light quantity is mounted on the external front surface of the display device 1, as shown in FIG. 1.

The control box 4 is arranged to select a display mode according to the external light quantity detected by the light quantity detecting element 7. Then, the display state of an image displayed on the image plane is adjusted to the setting values of the image plane brightness, contrast, contour enhancement, etc., which are set in combination for the display mode selected. For example, if the external light quantity is found by the light quantity detecting element 7 to be equal to or more than a predetermined light quantity, the HMD is judged to be used outdoors and a control operation is carried out to select the outdoor mode.

Figure 8:
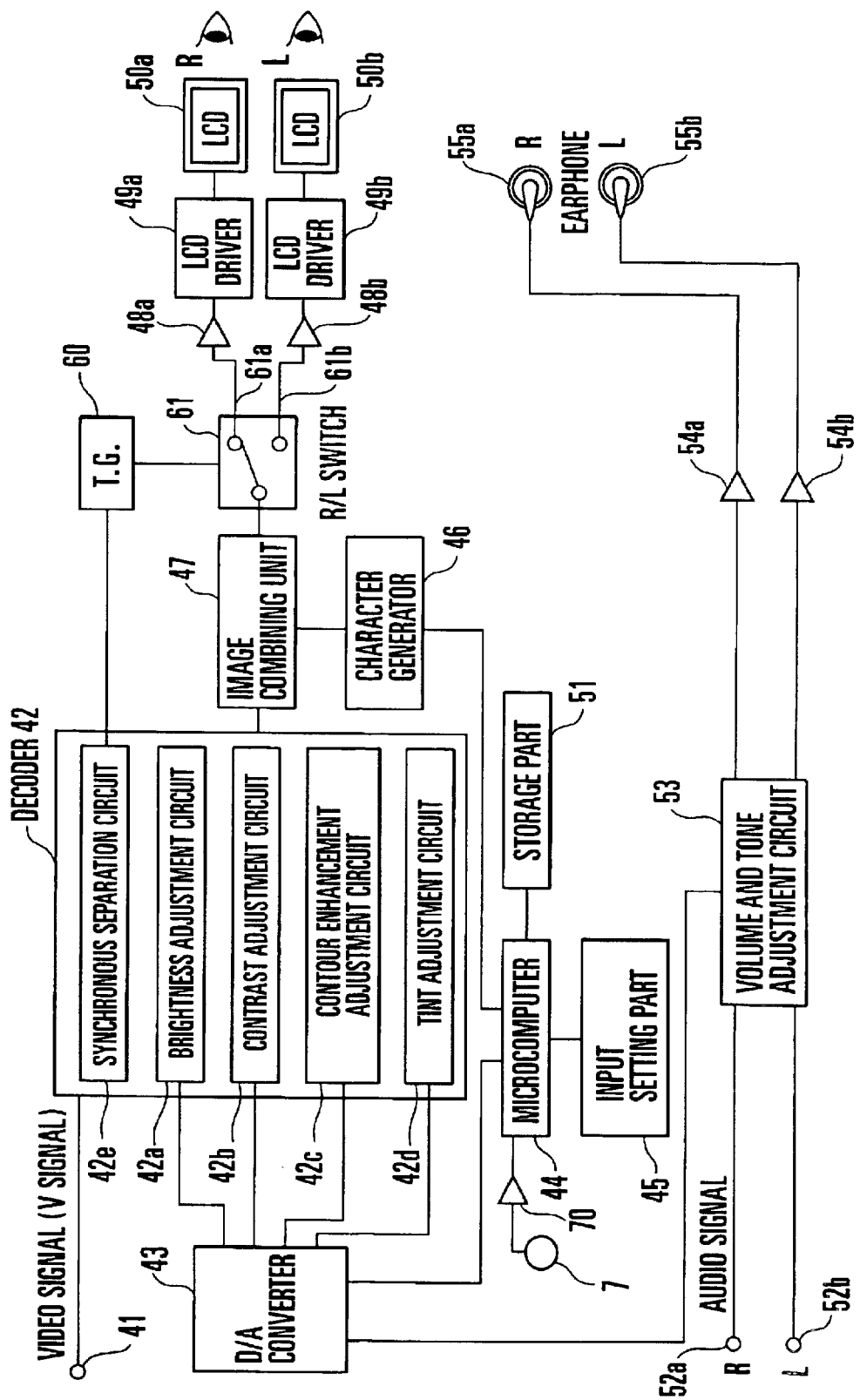
FIG. 8 is a block diagram showing the electrical arrangement of an HMD according to a third embodiment of the invention.

The arrangement of the third embodiment is described below with reference to FIG. 8 which is a block diagram showing the electrical arrangement of the HMD. In FIG. 8, all parts arranged in the same manner as those shown in FIG. 1 are shown by the same reference numerals as in FIG. 1.

With the brightness of the environment measured by the light quantity detecting element 7, the value of the measured light is amplified by an amplifier 70. The amplified light value is inputted to the microcomputer 44. The third embodiment differs from the first embodiment in that the third embodiment is provided with the light quantity detecting element 7 which is arranged to measure the brightness of the outside of the HMD.

Upon receipt of the measured light value, the microcomputer 44 performs an arithmetic operation on the measured light value. The result of the arithmetic operation is sent to the decoder 42 through the D/A converter 43. Then, the brightness adjustment circuit 42a, the contrast adjustment circuit 42b and the contour enhancement adjustment circuit 42c within the decoder 42 adjust respectively the rates of brightness, contrast and contour enhancement accordingly.

In accordance with the results of adjustment, a display is made on each of the LCDs 50a and 50b through the LCD drivers 49a and 49b.

In this instance, the brightness, contrast and contour enhancement of a character display may be left unadjusted irrespective of those of the image display.

While the description is given above on the assumption that the HMD is of the binocular type, the arrangement described above of course likewise applies also to a monocular-type HMD.

Figure 9:
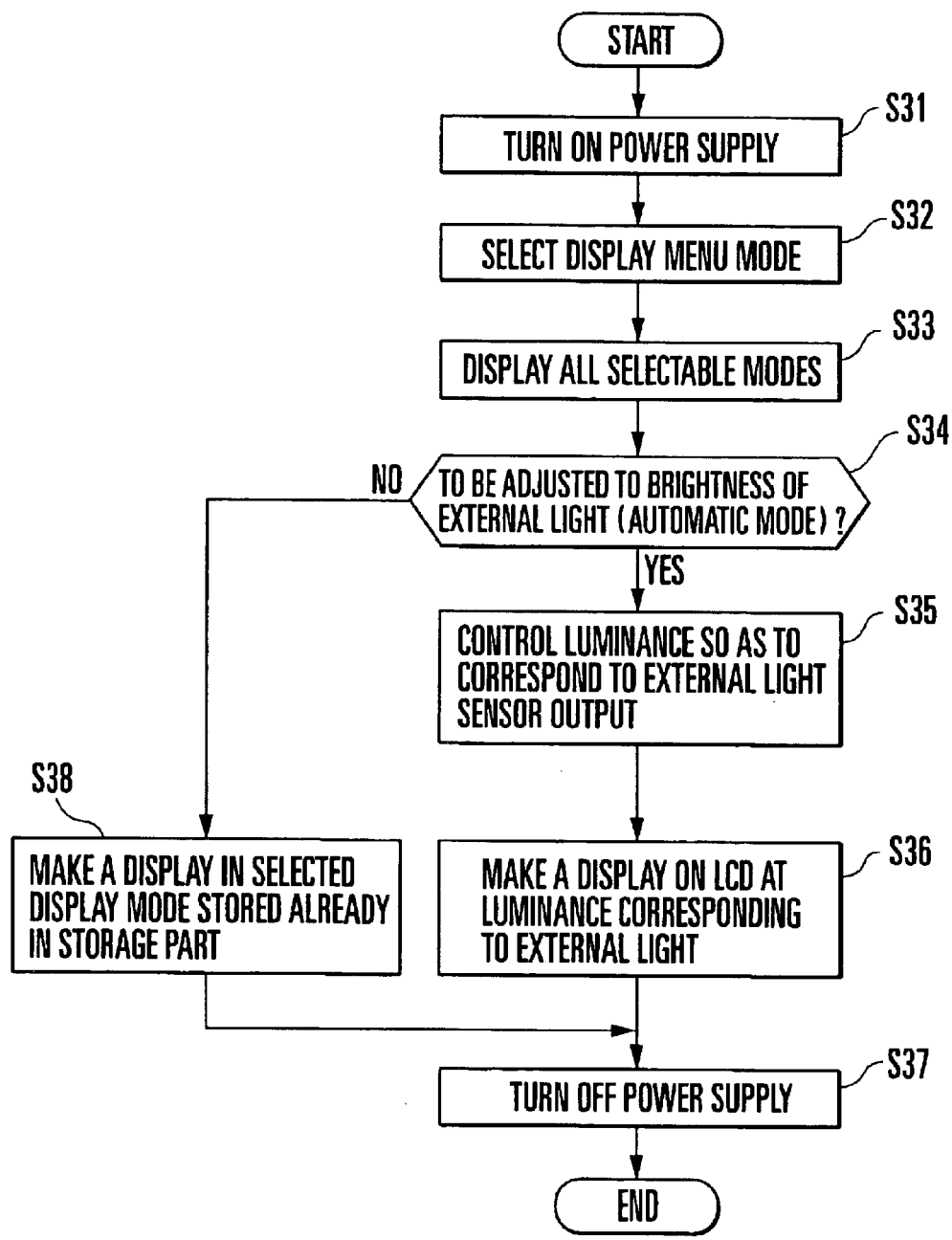
FIG. 9 is a flow chart showing procedures for selection of a display mode to be executed in the third embodiment of the invention.

FIG. 9 shows in a flow chart the display mode selecting procedures related to the brightness control described above with reference to FIG. 8.

The procedures of the flow chart of FIG. 9 are to be executed by the microcomputer 44 after the information on external light is photo-electrically converted by the light quantity detecting element 7 and the output of the light quantity detecting element 7 is amplified by the amplifier 70.

Referring to FIG. 9, the power supply of the HMD is turned on by the user at a step S31. At a step S32, a display menu mode is selected by operating the mode selection switch 6. At a step S33, all selectable modes are displayed on the image plane.

The menu display is made to show in a table all the selectable modes as shown in FIG. 4. In the case of the third embodiment, however, an automatic mode is added to the table as shown in FIG. 15.

A step S34 is provided for individually setting the brightness, contrast, contour enhancement, tint, etc., of the display image plene as desired by selecting one of the various modes on the menu.

Further, when the automatic mode is selected, the brightness, contrast, contour enhancement, tint, etc., of the image plane can be automatically set according to the brightness of external light. At the step S34, a check is made to find if the automatic mode is selected to adjust the image display setting values to the brightness of external light. If so, the flow of operation proceeds to steps S35 and S36. At the steps S35 and S36, the display luminance of the LCD is automatically adjusted according to the light quantity detected by the light quantity detecting element 7.

If the automatic mode is found at the step S34 to be not selected, the flow proceeds from the step S34 to a step S38. At the step S38, the image display state of the LCD is controlled according to the setting values of a display mode last selected.

At a step S37, with the display state controlled and set by the above-stated procedures, the power supply is turned off after completion of viewing video images.

While the third embodiment is arranged to adjust the display brightness and contrast by controlling the LCD, this arrangement may be changed to simply vary and adjust the illuminating light quantity of a back light or the like according to the external light quantity by varying a voltage, a current, a duty ratio, or the like.

Next, an HMD according to a fourth embodiment of the invention will be described.

In the case of the third embodiment shown in FIG. 8, the light quantity detecting element 7 is provided only at one place. Therefore, the brightness of the right display part and the brightness of the left display part are always adjusted in the same manner. However, the incident direction of external light is not always the same but varies with the HMD using environment. In actuality, therefore, the quantity of light coming through a gap between the right eye and the HMD might greatly differ from the quantity of light coming though a gap between the left eye and the HMD. In such a case, the adjustment of display brightness in the same manner for both the right and left eyes is not always apposite to the user.

Figure 10:
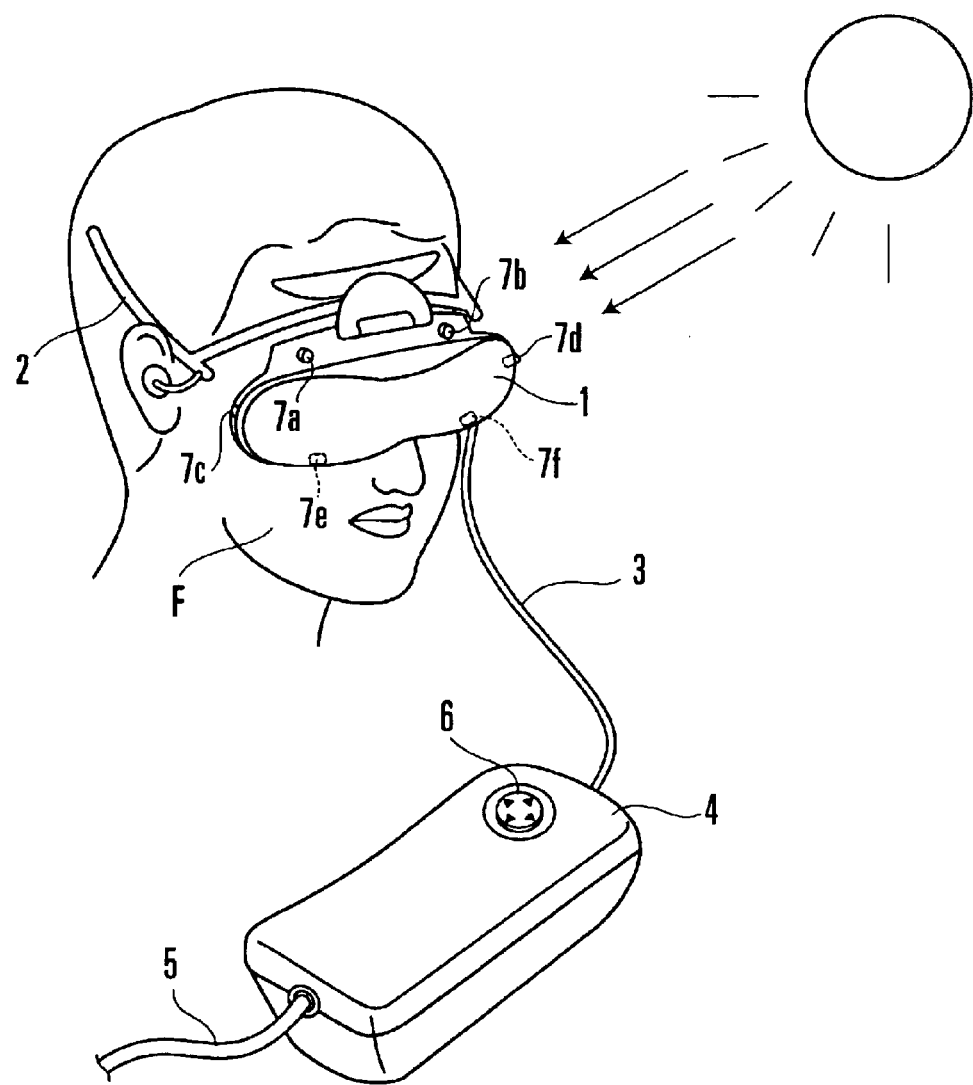
FIG. 10 is a perspective view showing an HMD according to a fourth embodiment of the invention.

The fourth embodiment of the invention solves this problem by providing two light quantity detecting elements 7a and 7b on the HMD corresponding to the right and left eyes of the user, as shown in FIG. 10. The light quantity detecting elements 7a and 7b are arranged to separately make the above-stated adjustment to enable both the right and left eyes to appositely and easily see video images.

Figure 11:
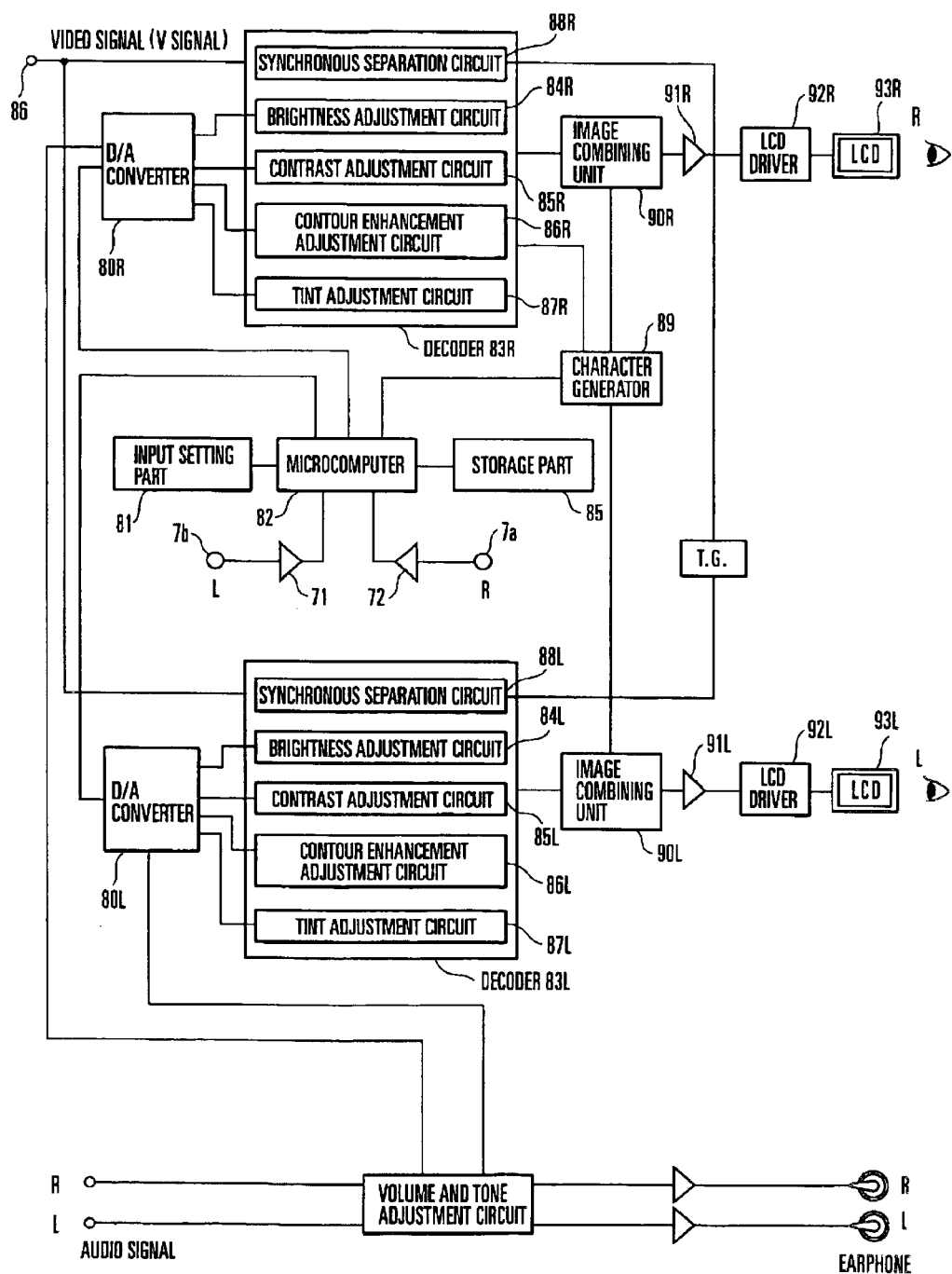
FIG. 11 is a block diagram showing the electrical arrangement of the HMD according to the fourth embodiment of the invention.

FIG. 11 is a block diagram showing the arrangement of the HMD according to the fourth embodiment of the invention. The HMD is mainly composed of an input setting part 81, a microcomputer 82, decoders 83R and 83L, D/A converters 80R and 80L and a storage part 85. The HMD is thus provided with LCD display adjusting functional elements arranged separately for the right and left eyes of the user.

Referring to FIG. 11, a video signal is inputted from a video image input terminal 86 to the decoders 83R and 83L. The decoders 83R and 83L include respectively brightness adjustment circuits 84R and 84L, contrast adjustment circuits 85R and 85L, contour enhancement adjustment circuits 86R and 86L and tint adjustment circuits 87R and 87L. In addition to these circuits, the decoders 83R and 83L are respectively provided with synchronous separation circuits 88R and 88L, each of which is arranged to separate and divide an input video signal into right and left images when the video signal input is a three-dimensional video signal.

In a case where the input video signal bears a two-dimensional video image, one and the same video image is sent out to right and left LCD drivers 92R and 92L without actuating a timing generator TG.

The microcomputer 82 operates in response to information from the input setting part 81 such as the mode selection switch 6, etc. The microcomputer 82 is thus arranged to control various circuit selecting actions of the D/A converters 80R and 80L.

The microcomputer 82 causes image combining units 90R and 90L to combine video signals adjusted by the decoders 83R and 83L with a predetermined character code signal or with a character code signal or image signal outputted from a character generator 89 which is arranged to generate an image signal.

Combined video images thus obtained are sent to the LCD drivers 92R and 92L through amplifiers 91R and 91L. The LCD drivers 92R and 92L are arranged to convert the combined video images into video signals suited for display by LCDs 93R and 93L.

A storage part 85, which is connected to the microcomputer 82, is arranged to store always updated information on the setting values designated by the microcomputer 82 to be set respectively at the decoders 83R and 83L.

At the storage part 85, information on a plurality of display modes is stored as combinations of setting values of the brightness, contrast, contour enhancement, tint, etc., of image planes. The information for the decoder 83R is stored separately from the information stored for the other decoder 83L, so that the decoders 83R and 83L can be provided with different contents of information.

Meanwhile, the output of the light quantity detecting element 7a mounted on the right side of the HMD for detecting the external light quantity and the output of the light quantity detecting element 7b mounted on the left side are amplified respectively by amplifiers 71 and 72. The outputs of the amplifiers 71 and 72 are sent to the microcomputer 82 as external light quantity values.

In accordance with the external light quantity values received, the microcomputer 82 causes, through the D/A converters 80R and 80L, the decoders 83R and 83L to respectively actuate the brightness adjustment circuits 84R and 84L, the contrast adjustment circuits 85R and 85L and the contour enhancement adjustment circuits 86R and 86L to individually adjust the brightness, the contract and the contour enhancement of the LCDs 93R and 93R.

These processes can be carried out by executing the flow of operation shown in FIG. 9 separately and in parallel for the right and left eyes of the user. Therefore, the details of a sequence of these processes are omitted from the description. With the sequence of processes carried out in this manner, video images can be displayed always in an easily-viewable state for both the right and left eyes of the user against external light impinging upon the HMD.

In a case where the automatic mode is found at the step S34 of FIG. 9 to be not selected and default setting values are to be used instead of the setting values of the automatic mode, the values of the items of adjustment can be manually set separately for right and left eyes of the user.

Further, video images on display can be made more easily viewable by mounting some color detecting element such as a CCD in place of the light quantity detecting element and by correcting the color temperature of the video image on display with respect to the color of external light.

While the light quantity detecting elements 7a and 7b are mounted at right and left positions on an upper surface of the HMD as shown in FIG. 10, the mounting positions may be changed to other positions 7c and 7d which are also shown in FIG. 10. Further, for external light incident on the HMD from below, the mounting positions may be changed to other positions 7e and 7f on a lower surface of the HMD as shown in FIG. 10.

Figure 12:
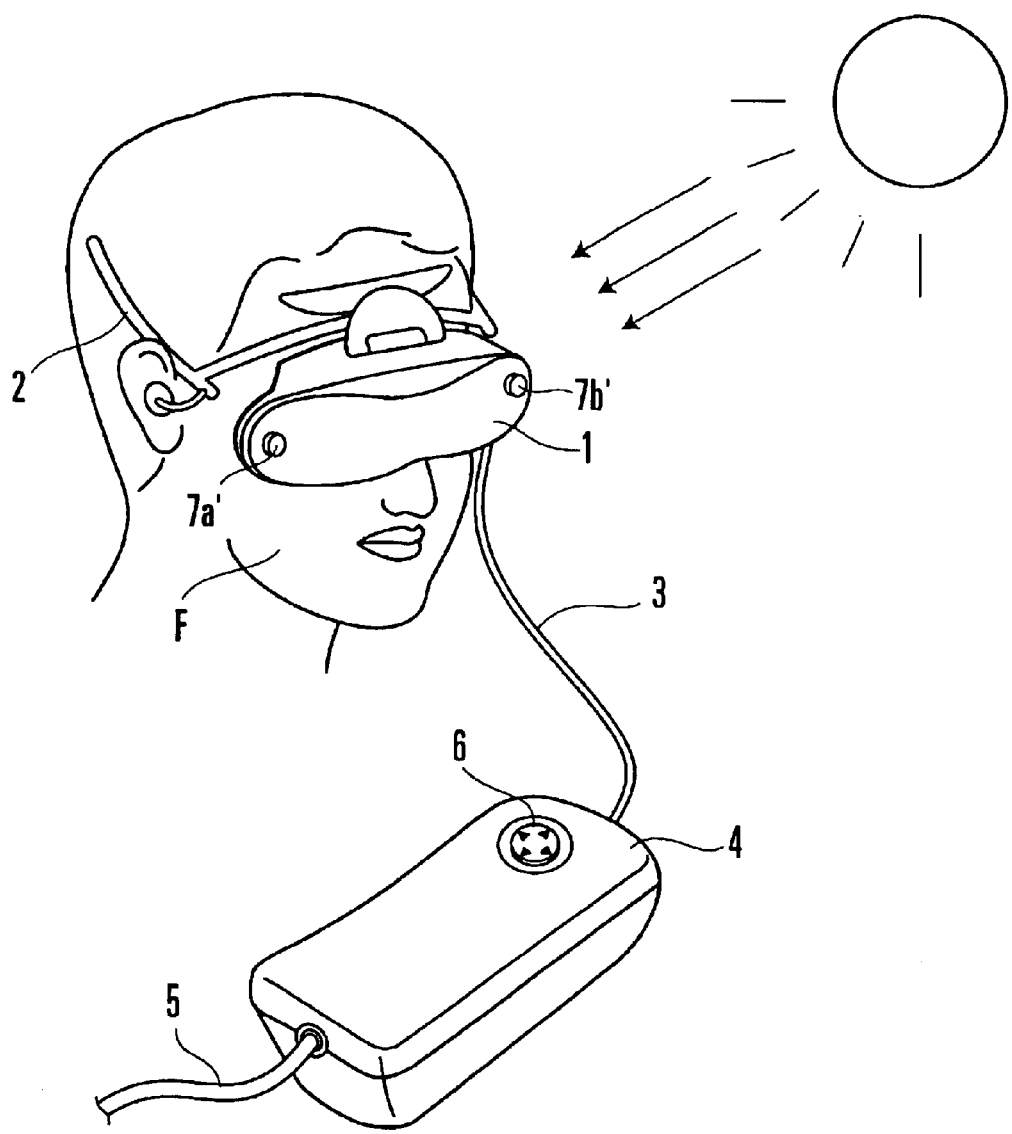
FIG. 12 is a perspective view showing an HMD according to a fifth embodiment of the invention.

FIG. 12 shows an HMD according to a fifth embodiment of the invention. In the case of the fifth embodiment, light quantity detecting elements 7a' and 7b' are mounted on the HMD at right and left positions on the front surface of the HMD. This allocation is effective particularly in a case where the HMD is of a see-through type, as in the case of the fifth embodiment.

Figure 13:
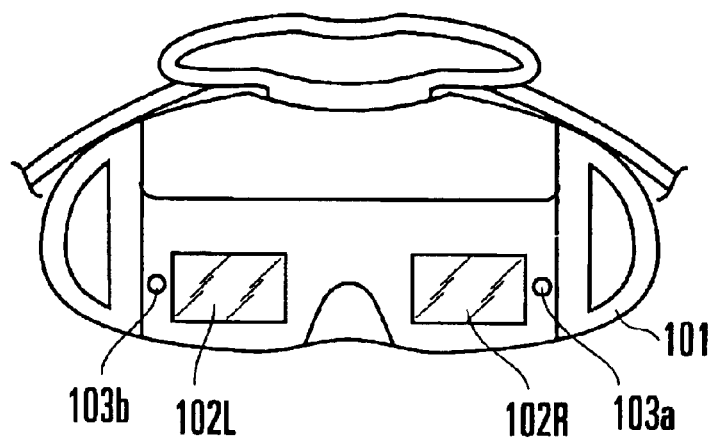
FIG. 13 is a perspective view showing an HMD according to a sixth embodiment of the invention.

FIG. 13 shows an HMD according to a sixth embodiment of the invention. In the case of the sixth embodiment, light quantity detecting elements 103a and 103b are allocated on the right and left sides of LCD image display windows 102R and 102L provided in an HMD body 101.

Figure 14:
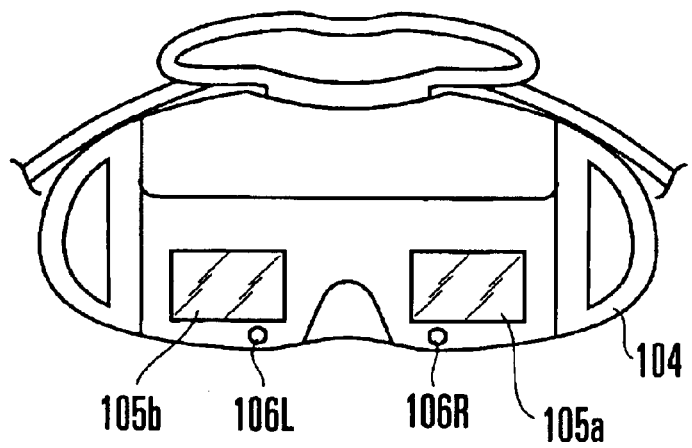
FIG. 14 is a perspective view showing an HMD according to a seventh embodiment of the invention.

FIG. 14 shows an HMD according to a seventh embodiment of the invention. In the case of the seventh embodiment, light quantity detecting elements 106R and 106L are allocated respectively below image display windows 105a and 105b provided in an HMD body 104.

In each of the sixth and seventh embodiments shown in FIGS. 13 and 14, the light quantity detecting elements are allocated in positions to detect the quantity of light impinging upon the face of the user. The allocation of the light quantity detecting elements is effective in a case where external light enters the HMD through a gap between the face of the user and the HMD to be reflected by the face and the reflection light glitters at the image display windows 102R and 102L or 106R and 106L to make video images on display not easily viewable.

While the light quantity detecting elements are allocated around the display device, the allocation may be changed to mount the light quantity detecting elements on some other parts such as a head mounting device.

In each of the embodiments disclosed, the control box may be provided with a Y-C (luminance and chrominance signals) separation circuit, a display element memory circuit, a driver circuit, etc.

The invention is of course applicable to a case where the functions of the HMD are arranged to be carried out by supplying the HMD with a program. In that case, the HMD is arranged, as an embodiment of the invention, to store the program as software.

Figure 7:
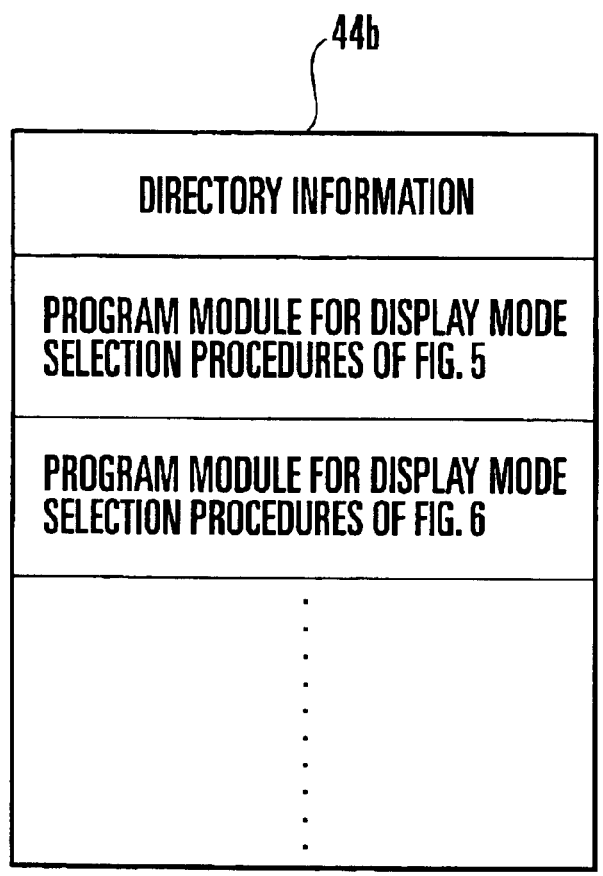
FIG. 7 is a diagram showing a memory map of a ROM 44 disposed inside of the microcomputer 44.

FIG. 7 shows a memory map of the ROM 44b disposed within the microcomputer 44. A program module for the display mode selecting procedures represented by the flow chart of FIG. 5 and a program module for the display mode selecting procedures represented by the flow chart of FIG. 6 are stored in the ROM 44b in each of the first and second embodiments. The arrangement for storing these program modules in the ROM 44b of the microcomputer 44 may be changed to store them in the storage part 51 together with information on the setting values of the various display modes. The storage medium for supplying the program modules is not limited to a ROM but may be selected from among some other storage media such as a floppy disk, a nonvolatile memory card, etc.

Each of the embodiments disclosed above has adjustment means for adjusting a plurality of setting values related to image display, and mode display means capable of changing over a plurality of display modes which differ in the setting values adjusted by the adjustment means, wherein the mode display means has a display mode suited to a bright external environment. With the invention applied to an HMD which is to be mounted on the head of the user, the HMD makes images on display easily viewable even under a bright environment condition without having any light shield arranged between the face of the user and the HMD.

In accordance with the invention, therefore, the HMD can be prevented from becoming heavy, cumbersome and sweltering and from giving the user some uneasy feeling of being hindered from knowing surrounding situations. The HMD according to the invention thus enables the user to enjoy viewing video images at any places as desired.

The plurality of setting values related to image display include setting values of at least two of the brightness, contrast, contour enhancement and tint of the image plane. Therefore, even in a case where an image displayed by an LCD becomes not easily viewable with the image plane simply adjusted to be brighter, the image on display can be made easily viewable even under a bright environment condition by adjusting contrast and contour enhancement in addition to the brightness.

In the display mode which is suited for a bright external environment, the setting values are combined to have a bright image plane, a strong contrast and strong contour enhancement. Therefore, even in cases where the image plane is not easily viewable under a bright external environment condition, the image plane can be promptly made easily viewable by selecting the display mode suited for such a bright external condition.

The HMD according to the invention is provided with selection means for selecting a display mode suited for a bright external environment from among other display modes. Since the selection means is arranged to be manually operable, the operability of the HMD can be enhanced by the invention.

The HMD according to the invention is provided with storage means for storing a display mode which has a combination of a plurality of setting values and is effective before the power supply is turned off. After that, when the power supply is turned on, the adjustment means mentioned above adjusts a current image display state according to the display mode stored in the storage means. Therefore, an image display mode which has been changed once can be retained as it is without setting it all over again.

Further, the HMD according to the invention is provided with external light detecting means for detecting the quantity of light coming from outside. Then, the above-stated adjustment means selects, according to the light quantity thus detected, a display mode for which the setting values of at least two of image plane brightness, contrast, contour enhancement and tint are combined for an image display. An image display state is adjusted to the selected display mode by the adjustment means. The provision of the external light detecting means for detecting the quantity of external light thus enables the HMD to automatically adjust the image display state to an easily-viewable state according to the brightness of an external environment.

What is claimed is:

1. A display apparatus comprising:
a display unit adapted to display a first image for a left eye and a second image for a right eye;
a first detecting element adapted to detect a brightness around the left eye;
a second detecting element adapted to detect a brightness around the right eye;
a first brightness adjusting unit adapted to adjust a brightness of the first image according to the brightness detected by the first detecting element; and
a second brightness adjusting unit adapted to adjust a brightness of the second image according to the brightness detected by the second detecting element,
wherein the first detecting element is allocated on a side facing to a face of user and is allocated on a lower side of a first display window which displays the first image; and
wherein the second detecting element is allocated on a side facing to a face of user and is allocated on a lower side of a second display window which displays the second image.

2. A display apparatus according to claim 1, further comprising:
a first contrast adjusting unit adapted to adjust a contrast of the first image according to the brightness detected by the first detecting element; and
a second contrast adjusting unit adapted to adjust a contrast of the second image according to the brightness detected by the second detecting element.

3. A display apparatus according to claim 1, wherein the first detecting element is adapted to detect a brightness between the left eye and the display unit, and wherein the second detecting element is adapted to detect a brightness between the right eye and the display unit.

4. A display apparatus according to claim 1, wherein said display apparatus is mountable on a user's head.

5. A display apparatus according to claim 1, wherein the first detecting element is adapted to detect a brightness between the left eye and the display unit, wherein the second detecting element is adapted to detect a brightness between the right eye and the display unit, and wherein said display apparatus is mountable on a user's head.

6. A display apparatus according to claim 1, further comprising:
a first tint adjusting unit adapted to adjust a tint of the first image according to the brightness detected by the first detecting element; and
a second tint adjusting unit adapted to adjust a tint of the second image according to the brightness detected by the second detecting element.

7. A display apparatus according to claim 1, further comprising:
a first contour enhancement adjusting unit adapted to adjust a contour enhancement of the first image according to the brightness detected by the first detecting element; and
a second contour enhancement adjusting unit adapted to adjust a contour enhancement of the second image according to the brightness detected by the second detecting element.

8. A method for a display apparatus including a display unit adapted to display a first image for a left eye and a second image for a right eye, the method comprising the steps of:
detecting a brightness around the left eye using a first detecting element;
detecting a brightness around the right eye using a second detecting element;
adjusting a brightness of the first image according to the brightness detected by the first detecting element; and
adjusting a brightness of the second image according to the brightness detected by the second detecting element;
wherein the first detecting element is allocated on a side acing to a face of user and is allocated on the lower side of a first display window which displays the first image; and
wherein the second detecting element is allocated on a side facing to a face of user and is allocated on the lower side of a second display window which displays the second image.

9. A method according to claim 8, ether comprising the steps of:
adjusting a contrast of the first image according to the brightness detected by the first detecting element; and
adjusting a contrast of the second image according to the brightness detected by the second detecting element.

10. A method according to claim 8, wherein the first detecting step is adapted to detect a brightness between the left eye and the display unit using the first detecting element, and wherein the second detecting step is adapted to detect a brightness between the right eye and the display unit using the second detecting element.

11. A method according to claim 8, wherein said display apparatus is mountable on a user's head.

12. A method according to claim 8, wherein the first detecting step is adapted to detect a brightness between the left eye and the display unit using the first detecting element, wherein the second detecting step is adapted to detect a brightness between the right eye and the display unit using the second detecting element, and wherein said display apparatus is mountable on a user's head.

13. A method according to claim 8, further comprising the steps of:

adjusting a tint of the fist image according to the brightness detected by the first detecting element; and adjusting a tint of the second image according to the brightness detected by the second detecting element.

14. A method according to claim 8, further comprising the steps of:

adjusting a contour enhancement of the first image according to the brightness detected by the first detecting element; and adjusting a contour enhancement of the second image according to the brightness detected by the second detecting element.

* * * * *

UNITED STATES PATENT AND TRADEMARK OFFICE
CERTIFICATE OF CORRECTION

PATENT NO. : 6,900,778 B1  
DATED : May 31, 2005  
INVENTOR(S) : Hiroshi Yamamoto Page 1 of 1

It is certified that error appears in the above-identified patent and that said Letters Patent is hereby corrected as shown below:

<u>Column 5,</u>
Line 50, delete "step S1" and insert -- step S11 --.
Line 54, delete "step 514" and insert -- step S14 --.
Line 65, delete "step 515" and insert -- step S15 --.

Signed and Sealed this

Twenty-first Day of March, 2006

JON W. DUDAS
*Director of the United States Patent and Trademark Office*